(12) United States Patent
Fukano

(10) Patent No.: US 8,345,741 B2
(45) Date of Patent: Jan. 1, 2013

(54) RECEIVING APPARATUS AND RECEIVING METHOD FOR REDUCING A WAITING PERIOD UPON SWITCHING A PROGRAM

(75) Inventor: Masaaki Fukano, Tokyo (JP)

(73) Assignee: Sony Corporation, Tokyo (JP)

( * ) Notice: Subject to any disclaimer, the term of this patent is extended or adjusted under 35 U.S.C. 154(b) by 1250 days.

(21) Appl. No.: 11/893,917

(22) Filed: Aug. 16, 2007

(65) Prior Publication Data

US 2008/0043155 A1 Feb. 21, 2008

(30) Foreign Application Priority Data

Aug. 18, 2006 (JP) ................................. 2006-223083

(51) Int. Cl.
*H04N 7/12* (2006.01)
(52) U.S. Cl. .................... 375/240.01; 375/242
(58) Field of Classification Search .............. 375/240.01
See application file for complete search history.

(56) References Cited

U.S. PATENT DOCUMENTS

| | | | |
|---|---|---|---|
| 5,477,263 A * | 12/1995 | O'Callaghan et al. ........ | 725/102 |
| 6,151,078 A | 11/2000 | Yoneda et al. | |
| 6,598,233 B1 | 7/2003 | Choi | |
| 2002/0059600 A1 * | 5/2002 | Matsumoto et al. ............ | 725/40 |
| 2002/0196856 A1 * | 12/2002 | Miro Sorolla et al. ... | 375/240.25 |
| 2003/0161395 A1 * | 8/2003 | Byers ....................... | 375/240.01 |
| 2005/0024532 A1 * | 2/2005 | Choi ............................ | 348/441 |
| 2005/0114901 A1 * | 5/2005 | Yui et al. ....................... | 725/100 |

FOREIGN PATENT DOCUMENTS

| | | |
|---|---|---|
| EP | 1 156 670 | 11/2001 |
| JP | 11 122547 | 4/1999 |
| JP | 2000 13696 | 1/2000 |
| JP | 2001-203989 | 7/2001 |
| JP | 2001-346109 | 12/2001 |
| JP | 2003-348470 | 12/2003 |
| JP | 2004-312629 | 11/2004 |
| JP | 2004 328366 | 11/2004 |
| JP | 2005 184563 | 7/2005 |
| JP | 2005-260401 | 9/2005 |
| JP | 2006 74241 | 3/2006 |
| JP | 2006-148969 | 6/2006 |

* cited by examiner

*Primary Examiner* — Edward Zee
*Assistant Examiner* — Yogesh Paliwal
(74) *Attorney, Agent, or Firm* — Frommer Lawrence & Haug LLP; William S. Frommer; Thomas F. Presson

(57) ABSTRACT

A receiving apparatus is disclosed. A digital tuner section selects a modulation signal having a predetermined frequency from a radio wave of a digital television broadcast, demodulates the modulation signal, and outputs a resultant transport stream. A separation section separates the transport stream into a video stream and an additional stream. A decoder decodes the video stream and outputs a picture signal. The picture processing section performs a predetermined picture process for the picture signal. A control section obtains program information containing information about a picture signal type of a program that is broadcast from the additional data and creates a program information database based on the program information. A storage section stores the program information database. The control section controls the picture process based on the picture signal type obtained with reference to the program information database in parallel with processes of the digital tuner section and the separation section.

5 Claims, 7 Drawing Sheets

RELATED ART

Fig. 3

| DATA STRUCTURE | bit |
|---|---|
| event_information_section() { | |
|   table_id | 8 |
|   section_syntax_indicator | 1 |
|   reserved_future_use | 1 |
|   reserved | 2 |
|   section_length | 12 |
|   service_id | 16 |
|   reserved | 2 |
|   version_number | 5 |
|   current_next_indicator | 1 |
|   section_number | 8 |
|   last_section_number | 8 |
|   transport_stream_id | 16 |
|   original_network_id | 16 |
|   segment_last_section_number | 8 |
|   last_table_id | 8 |
|   for(i=0;i<N, i++) { | |
|     event_id | 16 |
|     start_time | 40 |
|     duration | 24 |
|     running_status | 3 |
|     free_CA_mode | 1 |
|     descriptors_roop_length | 12 |
|     for(j=0;j<M, j++) { | |
|       descriptor() | |
|     } | |
|   CRC_32 | 32 |
| } | |

Fig. 4

| COMPONENT CONTENT | COMPONENT TYPE | DESCRIPTION |
|---|---|---|
| 0x01 | 0x01 | PICTURE = 480i, ASPECT RATIO = 4 : 3 |
| | 0x03 | PICTURE = 480i, ASPECT RATIO = 16 : 9 |
| | 0x04 | PICTURE = 480i, ASPECT RATIO > 16 : 9 |
| | 0xA1 | PICTURE = 480p, ASPECT RATIO = 4 : 3 |
| | 0xA3 | PICTURE = 480p, ASPECT RATIO = 16 : 9 |
| | 0xA4 | PICTURE = 480p, ASPECT RATIO > 16 : 9 |
| | 0xB1 | PICTURE = 1080i, ASPECT RATIO = 4 : 3 |
| | 0xB3 | PICTURE = 1080i, ASPECT RATIO = 16 : 9 |
| | 0xB4 | PICTURE = 1080i, ASPECT RATIO > 16 : 9 |
| | 0xC1 | PICTURE = 720p, ASPECT RATIO = 4 : 3 |
| | 0xC3 | PICTURE = 720p, ASPECT RATIO = 16 : 9 |
| | 0xC4 | PICTURE = 720p, ASPECT RATIO > 16 : 9 |
| | 0xD1 | PICTURE = 240p, ASPECT RATIO = 4 : 3 |
| | 0xD3 | PICTURE = 240p, ASPECT RATIO = 16 : 9 |
| | 0xD4 | PICTURE = 240p, ASPECT RATIO > 16 : 9 |

Fig. 5

| SERVICE IDENTIFICATION | TIME | | | PICTURE SIGNAL TYPE | |
|---|---|---|---|---|---|
| | DATE | START TIME | DURATION | RESOLUTION | ASPECT RATIO |
| ... | ... | ... | ... | ... | ... |
| 0x0400 | 06/8/1 | 20:00 | 1:00 | 480i | 4:3 |
| 0x0400 | 06/8/1 | 21:00 | 2:00 | 1080i | 16:9 |
| 0x0400 | 06/8/1 | 23:00 | 1:00 | 480i | 4:3 |
| ... | ... | ... | ... | ... | ... |
| 0x0400 | 06/8/2 | 10:00 | 0:30 | 720p | 16:9 |
| ... | ... | ... | ... | ... | ... |

RECEIVING APPARATUS AND RECEIVING METHOD FOR REDUCING A WAITING PERIOD UPON SWITCHING A PROGRAM

CROSS REFERENCES TO RELATED APPLICATIONS

The present invention contains subject matter related to Japanese Patent Application JP 2006-223083 filed in the Japanese Patent Office on Aug. 18, 2006, the entire contents of which being incorporated herein by reference.

BACKGROUND OF THE INVENTION

1. Field of the Invention

The present invention relates to a receiving apparatus and a receiving method that are capable of receiving for example digital television broadcasts.

2. Description of the Related Art

Ground digital television broadcasts have started all over Japan. As the number of users of ground digital television broadcasts are rapidly increasing, television receivers and television receiving apparatus for ground digital television broadcasts are rapidly widespreading.

In a receiving apparatus for a ground digital television broadcast, a modulation signal having a predetermined frequency is selected from a radio wave of a ground digital television broadcast received through an antenna connected outside the receiving apparatus. The selected modulation signal is processed by for example a demodulation process. As a result, a transport stream (TS) is obtained. When necessary, the TS is descrambled. The descrambled TS is filtered and separated into for example a picture, a sound, and data. The separated picture, sound, and data are decoded and provided to the user.

Such a receiving apparatus for a ground digital television broadcast is described in "Digital Broadcasting Receiving Apparatus (translated title)", Standard SRIB STD-B21, Association of Radio Industries and Businesses, Japan.

Unlike an analog television broadcast, in a ground digital television broadcast, a picture signal type including resolution, aspect ratio, and so forth can be flexibly changed on the basis of a broadcasting station, a channel, and a watching hour. Thus, in a television receiver and a television receiving apparatus for ground digital television broadcasts, it is necessary to dynamically follow changes of broadcast picture signal types.

Thus, a receiving apparatus of the related art changes resolutions, aspect ratios, and so forth based on information about a picture signal type contained in a sequence header of an MPEG-2 (Moving Picture Experts Group-2) video stream of which a TS received from a transmission facility has been decoded.

In addition, a television receiver and a television receiving apparatus for ground digital television broadcasts are provided with a picture processing circuit that improves a picture quality. The picture processing circuit performs an advanced picture process for a picture signal to improve the picture quality. The picture processing circuit performs a picture process including noise removal, resolution conversion, and frame interpolation for each picture signal based on preset information of each picture signal and each picture signal type contained in the foregoing sequence header.

A technology of improving a picture quality by performing a predetermined picture process for a decoded video stream is described in Japanese Patent Application Laid-Open No. 2005-184563.

SUMMARY OF THE INVENTION

In the foregoing receiving apparatus, while a received TS is being decoded and a picture process is being performed for the TS, the received picture becomes unstable. When the picture is displayed on a display section or the like, the picture becomes disturbed. To conceal a disturbed picture during the decoding process and picture process from the user, the receiving apparatus performs a mute process of causing a picture during the decoding process and picture process not to be displayed and a mute cancellation process of causing a picture to be displayed after these processes have been completed.

Specifically, as shown in FIG. 1, when the user selects a program with an operating section of the receiving apparatus at time A, the receiving apparatus performs a program selection process in such a manner that a digital tuner section performs a tuning process and a demodulation process, a descrambler performs a descrambling process, and a decoder performs a decoding process in a hatched region from time A to time B.

In the region from time A to time B, the video stream has not yet been completed. Since a complete picture is not output, a disturbed picture is displayed on the display section. To prevent a disturbed picture from being displayed on the display section, the mute process is performed in the region from time A to time B.

After the decoding process has been completed at time B, a picture signal can be output from the decoder. At time C, a picture signal type is obtained from a sequence header of the video stream. In a hatched region from time C to time D, a picture processing section performs a picture process for the picture signal based on the picture signal type.

In the region from time C to time D, the picture is also disturbed and is not capable of being stably output. As a result, a disturbed picture is displayed on the display section. Thus, to prevent a disturbed picture from being displayed on the display section, in the region from time C to time D, the mute process is performed again.

After the picture process has been completed at time D, when a picture is capable of being stably displayed, the mute cancellation process is performed. As a result, a picture is stably displayed on the display section.

Thus, when a program is selected in such a manner that picture signal types are changed, in the region after a program is selected until a picture signal is decoded and in the region of which a picture process is performed for a picture signal, since the picture is disturbed, the mute process is performed such that no picture is displayed on the display section. Thus, a time period after the user selects a program until a picture is stably displayed in a ground digital television broadcast is larger than that in an analog television broadcast.

This problem frustrates many users of ground digital television broadcasts and is preventing television receivers and television receiving apparatus for ground digital television broadcasts from widespreading.

In view of the foregoing, it would be desirable to provide a receiving apparatus and a receiving method that allow a time period after a program is selected until a picture is displayed to be decreased.

According to an embodiment of the present invention, there is provided a receiving apparatus. The receiving apparatus includes a digital tuner section, a separation section, a decoder, a picture processing section, a control section, and a storage section. The digital tuner section selects a modulation signal having a predetermined frequency from a radio wave of a digital television broadcast, demodulates the modulation signal, and outputs a resultant transport stream. The separation section separates the transport stream into a video stream and an additional stream. The decoder decodes the video stream and outputs a picture signal. The picture processing section performs a predetermined picture process for the picture signal. The control section obtains program information containing information about a picture signal type of a program that is broadcast from the additional data and creates a program information database based on the program information. The storage section stores the program information database. The control section controls the picture process based on the picture signal type obtained with reference to the program information database in parallel with processes of the digital tuner section and the separation section.

According to an embodiment of the present invention, there is provided a receiving method. A modulation signal having a predetermined frequency is selected from a radio wave of a digital television broadcast. The modulation signal is demodulated. A resultant transport stream is output. The transport stream is separated into a video stream and an additional stream. The video stream is decoded. The resultant picture signal is output. A predetermined picture process is performed for the picture signal. Program information containing information about a picture signal type of a program that is broadcast is obtained from the additional data. A program information database is created based on the program information. The program information database is stored. The control step is performed by controlling the picture process based on the picture signal type obtained with reference to the program information database in parallel with processes at the selecting step and the separating step.

As described above, according to the foregoing embodiments of the present invention, since the picture process is performed on the basis of picture signal types described in the program information database prestored in the storage section, in parallel with the selecting step and the separating step, the picture process is performed at the picture processing step.

According to the foregoing embodiments of the present invention, since the program selection process of obtaining a video stream and additional data from a radio wave of a digital television broadcast and the picture process for the picture signal are performed in parallel, the time period after a program is selected until a picture is displayed can be decreased.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a schematic diagram showing a data structure of an EIT;

FIG. 4 is a schematic diagram showing the content of a component descriptor described in the EIT;

FIG. 5 is a schematic diagram showing an exemplary program information database according to an embodiment of the present invention;

DETAILED DESCRIPTION OF THE PREFERRED EMBODIMENTS

Next, an embodiment of the present invention will be described. In the embodiment of the present invention, picture signal types including resolutions, aspect ratios, and so forth are prestored. When a program selection process is performed, a picture process is performed in parallel on the basis of information about the picture signal type such that a time period necessary for displaying a picture is decreased. In the following, an exemplary receiving apparatus that is capable of receiving a ground digital television broadcast will be described.

Figure 1:
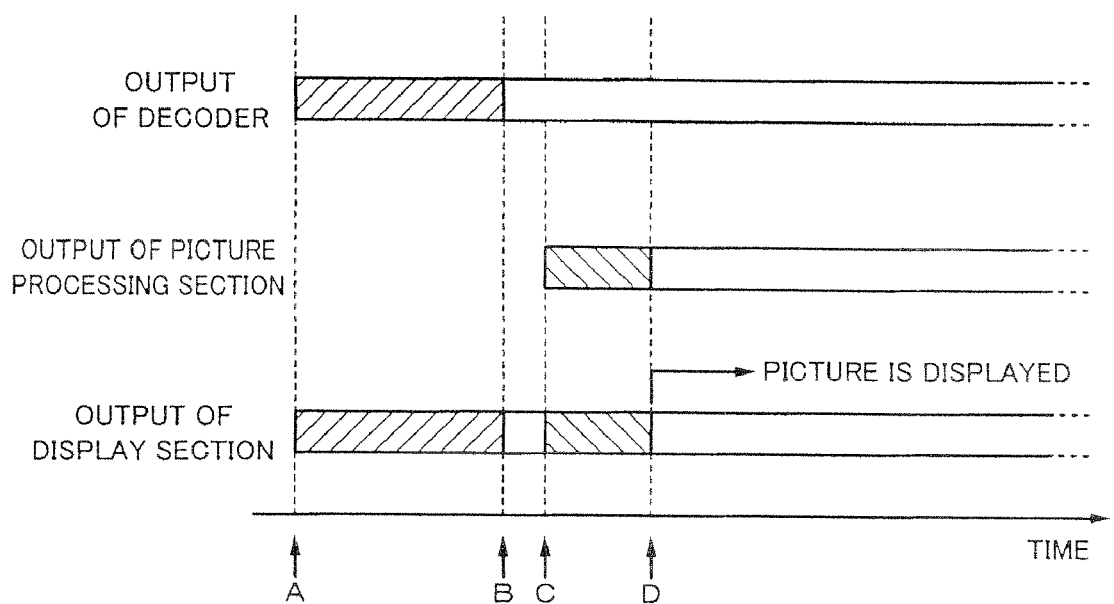
FIG. 1 is a schematic diagram showing an exemplary timing of a mute process performed after a program is selected until a picture is displayed when a receiving method of a receiving apparatus of the related art is applied.
Figure 2:
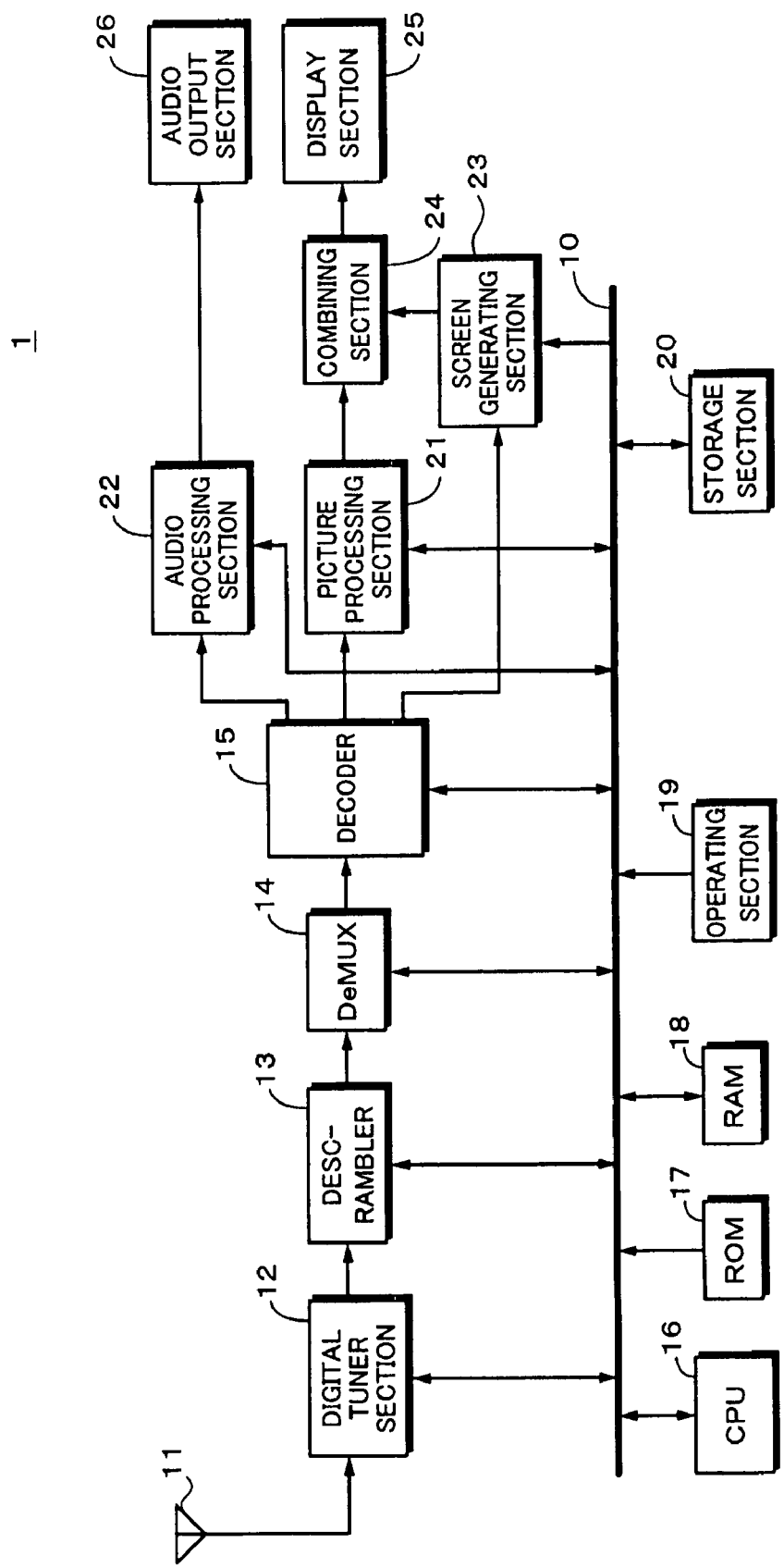
FIG. 2 is a block diagram showing an exemplary structure of a receiving apparatus according to an embodiment of the present invention.

First of all, with reference to FIG. 2, an exemplary structure of a receiving apparatus 1 according to an embodiment of the present invention will be described. The receiving apparatus 1 includes a digital tuner section 12, a descrambler 13, a DeMUX (De-MUltipleXer) section 14 as a separating section, a decoder 15, a CPU (Central Processing Unit) 16 as a control section, a ROM (Read Only Memory) 17, a RAM (Random Access Memory) 18, an operating section 19, a storage section 20, a picture processing section 21, an audio processing section 22, a screen generating section 23, and a combining section 24 that are connected through a bus 10.

The receiving apparatus 1 receives a radio wave of a ground digital television broadcast transmitted from a broadcasting facility (not shown) through an antenna 11 connected to the outside of the receiving apparatus 1 and supplies the received radio wave of the ground digital television broadcast to the digital tuner section 12.

The digital tuner section 12 selects a modulation signal having a predetermined frequency from the radio wave of the ground digital television broadcast supplied through the antenna 11, performs predetermined signal processes such as a demodulation process and an error correction process for the selected modulation signal, and outputs a resultant transport stream (TS). When necessary, the descrambler 13 performs a descrambling process for the TS and outputs the descrambled TS.

The DeMUX section 14 filters the supplied TS based on the value of a PID (Packet IDentification) that is stored in a header portion of each TS packet of the supplied TS and that identifies each TS packet, extracts necessary streams that have been multiplexed such as a video stream and an audio stream from the supplied TS, and supplies the extracted streams to the decoder 15. In addition, the DeMUX section 14 extracts a table describing program information called the EIT (Event Information Table) from the supplied TS and supplies the EIT to the CPU 16. The EIT will be described later in detail.

The decoder 15 performs a decoding process for the video stream, audio stream, and additional data and outputs a picture signal, an audio signal, and additional data. The decoded picture signal is supplied to the picture processing section 21. The decoded audio signal is supplied to the audio processing section 22. The decoded additional data are supplied to the screen generating section 23.

The picture processing section 21 performs a predetermined picture process including a noise reduction process, a resolution conversion process, a frame interpolation process, and so forth for the supplied picture signal and supplies the processed picture signal to the combining section 24. In this example, the picture processes include a parameter setting process for resolution, aspect ratio, and so forth of for example a video stream to be decoded, a process based on parameters that have been set, a process corresponding to the resolution of a display section 25 composed of for example an LCD. In addition, the audio processing section 22 performs a predetermined audio process for the supplied audio signal and supplies the processed audio signal to the combining section 24. The supplied audio signal is output from the combining section 24.

The operating section 19 is composed of for example a remote control commander and outputs information that causes a program table of a predetermined date and time to be displayed, program selection information, and so forth. The information outputted from the operating section 19 is supplied to the CPU 16.

The CPU 16 controls each section connected to the bus 10 with the RAM 18 as a work memory on the basis of a program prestored in the ROM 17. In addition, the CPU 16 controls the digital tuner section 12 and the DeMUX section 14 on the basis of the program selection information supplied from the operating section 19 such that a signal having a predetermined frequency is selected. In addition, the CPU 16 creates a program information database on the basis of the EIT supplied from the DeMUX section 14 and supplies the program information database to the storage section 20. The program information database will be described later in detail. The CPU 16 may supply the EIT supplied from the DeMUX section 14 to the storage section 20 such that it stores the EIT.

The storage section 20 stores various types of information such as the EIT and program information database supplied from the CPU 16. The storage section 20 is a nonvolatile memory such as an EEPROM (Electrically Erasable and Programming ROM).

The screen generating section 23 generates an OSD (On Screen Display) screen on the basis of the additional data supplied from the decoder 15 and the EIT stored in the storage section 20. In addition, the screen generating section 23 generates setting screens such as a menu screen and a program table screen on the basis of a use's operation of the operating section 19. The generated OSD screen and setting screens are supplied to the combining section 24.

The combining section 24 combines the picture signal supplied from the picture processing section 21 and the OSD screen and the setting screens supplied from the screen generating section 23 by for example an OSD process and supplies the combined screen to the display section 25. When the OSD screen and the setting screen are not supplied from the screen generating section 23, the combining section 24 supplies only the picture signal supplied from the picture processing section 21 to the display section 25. Examples of the display section 25 include a CRT (Cathode Ray Tube) and an LCD (Liquid Crystal Display).

Next, the program information database according to an embodiment of the present invention will be described. The program information database is created on the basis of a table that describes information about programs called the EIT contained in the TS.

First, the EIT used in the program information database will be described. The TS defined in the MPEG-2 systems contains SI (Service Information) used to display for example an EPG (Electronic Program Guide). The SI is composed of section formatted data describing information about programs and services. The SI contains the EIT describing information about programs.

The EIT is a table describing information about programs for example titles, broadcast dates and times, and contents of programs contained in services. The EIT is categorized as EIT [p/f] and EIT [schedule]. The EIT [p/f] describes program information of a program that is currently being broadcast and a next scheduled program. The EIT [schedule] describes program information for a predetermined time period, for example one week ahead. In the following description, the EIT [p/f] and EIT [schedule] are generally called the EIT.

As shown in FIG. 3, the EIT represents information about programs such as titles, broadcast dates and times, and contents of programs. Next, concerned portions of the EIT will be described. "table_id" represents a table identification assigned to identify a table to which a section belongs. "service_id" represents a service identification assigned to identify each service. "event_id" represents an ID (IDentification) of a target event uniquely assigned in service_id. "start_time" represents a start time of a program. "duration" represents a duration for which a program lasts.

In addition, the EIT contains component descriptors for components as elements that compose a picture, a sound, and so forth. A component descriptor describes information about a resolution, an aspect ratio, an audio mode, and so forth of a picture. In other words, a component descriptor describes a component content representing the type of a stream and a component type such as a picture, a sound, or data. With these two description portions, the encoding format of a component can be determined.

As shown in FIG. 4, the resolution and aspect ratio of a picture signal depend on the component content value and component type value. When the component content is for example "0x01", it represents a video stream. When the component content is for example "0x02", it represents an audio stream. The component type is defined corresponding to the component content.

When the component content is for example "0x01" and the component type is for example "0xB1", they denote that this stream is a video stream and that the resolution is "1080i (i stands for interlace)" and the aspect ratio is "4:3". FIG. 4 lists only a component content value and component type values that can be designated for a ground digital television broadcast. In FIG. 4, "0x" preceded by each value represents hexadecimal notation.

As shown in FIG. 5, the program information database correlates program service identifications (service_id) with times (start_time and duration) and picture signal types including resolutions and aspect ratios. When a service identification and a time are specified, a picture signal type of a program can be obtained.

Field "service identification" describes the value of "service_id" contained in the foregoing EIT. Field "time" describes the date, start time, and duration of the program based on "start_time" and "duration" contained in the EIT. Field "picture signal type" describes a picture signal type used in the picture process, for example information such as the resolution and aspect ratio described with a component descriptor in the EIT. For example, when the service identification is "0x0400" and the program starts at "August 1, 2006, 21:00", the program information database shows that the resolution is "1080i" and the aspect ratio is "16:9".

When the program information database is created with the obtained EIT and stored, not only a picture signal type of a program that is being broadcast, but those of programs that will be broadcast in future can be pre-obtained.

When one program is composed of a plurality of picture components, a plurality of component descriptors are contained in the EIT. In this case, it is preferred to obtain a component descriptor for a picture component that is presented first.

In the foregoing example, the program information database is creased with the EIT. Instead, the EIT may be stored as program information database to the storage section 20. In other words, as long as a picture signal type can be retrieved from the program information database by specifying a service identification and the date and time of a program, any format of the program information database may be used.

Figure 6:
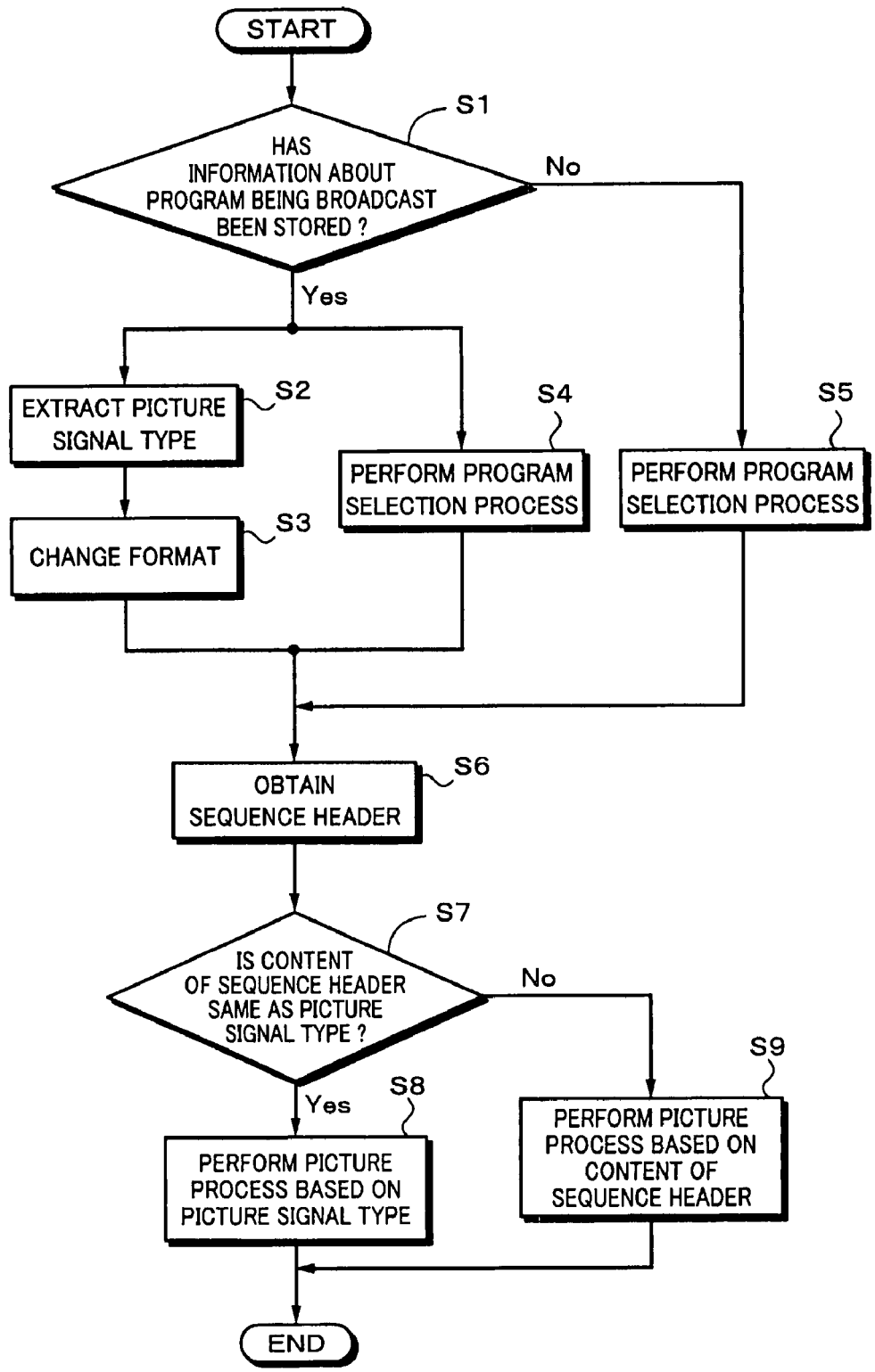
FIG. 6 is a flow chart showing a flow of a process of a receiving method of the receiving apparatus according to an embodiment of the present invention.

Next, a receiving method of the receiving apparatus 1 according to an embodiment of the present invention will be described. FIG. 6 is a flow chart showing a flow of processes of the receiving method of the receiving apparatus 1 according to an embodiment of the present invention.

When the user performs a channel selection operation with the operating section 19, the process starts from step S1. At step S1, the CPU 16 searches the program information database stored in the storage section 20 for program information about the selected program based on the service identification and the date and time of the program. When the searched result denotes that the target program has been registered in the program information database, the flow advances to step S2 and step S4.

At step S2, the CPU 16 extracts a picture signal type including the resolution and aspect ratio of the retrieved program from the program information database stored in the storage section 20. At step S3, the CPU 16 sets the resolution and aspect ratio of the picture signal that is output from the decoder 15 based on the resolution and aspect ratio described in the picture signal type extracted at step S2 and changes the output format of the decoder 15 with the resolution and aspect ratio that have been set. At this point, the display section 25 displays a disturbed picture. Thus, before the picture process is performed, the mute process of causing a picture not to be displayed is performed. After the picture process is completed, the mute cancellation process is performed.

At step S4, in parallel with the foregoing step S2 and step S3, the program selection process is normally performed. The digital tuner section 12 selects a modulation signal having a frequency corresponding to the user's program selection operation from the radio wave supplied through the antenna 11, performs a predetermined signal process such as a demodulation process for the modulation signal, and outputs the resultant TS. The descrambler 13 performs a process of descrambling the TS. The DeMUX section 14 filters the descrambled TS and obtains necessary streams such as a video stream and an audio stream therefrom. At this point, since the display section 25 displays a disturbed picture, before the program selection process is performed, the mute process is performed.

In contrast, when the searched result at step S1 denotes that the program information of the target program has not been stored, the flow advances to step S5. At step S5, the same program selection process as step S4 is performed. Before the program selection process is performed, the mute process is performed.

At step S6, the decoder 15 performs the decoding process for the video stream obtained in the program selection process at step S4 or step S5 and outputs a resultant picture signal. When the output format of the decoder 15 has been changed at step S3, the decoding process is performed on the basis of the changed format. The CPU 16 obtains information about the picture signal type from the sequence header of the video stream.

At step S7, the CPU 16 compares the picture signal type described in the sequence header with the picture signal type of the target program described in the program information database. When the compared result denotes that they match, the flow advances to step S8.

At step S8, the picture processing section 21 performs the picture process based on the picture signal type in the changed format. When the picture signal for which the picture process has been performed is output from the picture processing section 21, the mute cancellation process is performed. Thereafter, the resultant picture is displayed on the display section 25. As a result, all the processes of the flow chart have been completed.

When the compared result at step S7 denotes that the picture signal type described in the sequence header is different from that of the target program, the flow advances to step S9. At step S9, the picture processing section 21 performs the picture process based on the picture signal type described in the sequence header. Before the picture process is performed, in the same manner as step S4, the mute process of causing a picture not to be displayed is performed. After the picture process is completed, the mute cancellation process is performed. The resultant picture is displayed on the display section 25. As a result, all the processes of the flow chart have been completed.

At step S3, the format of the output of the decoder 15 is changed on the basis of the picture signal type described in the program information database. Thus, it is assumed that the scheduled program is not changed. Information about the picture signal type described in the program information database is based on the EIT that has been transmitted before the target program is broadcast. Thus, after the EIT is transmitted, before the program is changed, the changed program is not reflected to the EIT. Thus, when the format is changed with the program information database based on the EIT, it is thought that the picture signal type described in the program information database is different from that of the changed program. Thus, when the program was changed, since the picture signal type described in the sequence header of the video stream of the program is accurate, the picture process is performed on the basis of the picture signal type described in the sequence header.

Thus, in this embodiment of the present invention, the picture process based on the information about the picture signal type described in the program information database prestored in the storage section 20 and the program selection process are performed in parallel. Thus, the time period after the user performs the program selection operation until a picture is stably displayed can be decreased.

Figure 7A:
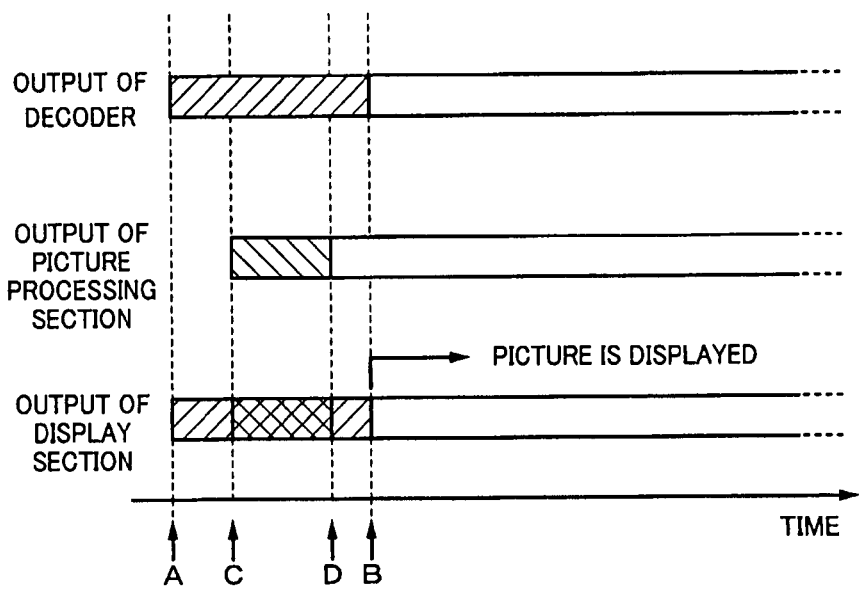
FIG. 7 is a schematic diagram showing an exemplary timing of a mute process performed after a program is selected until a picture is displayed when the receiving method according to the embodiment of the present invention is applied.
Figure 7B:
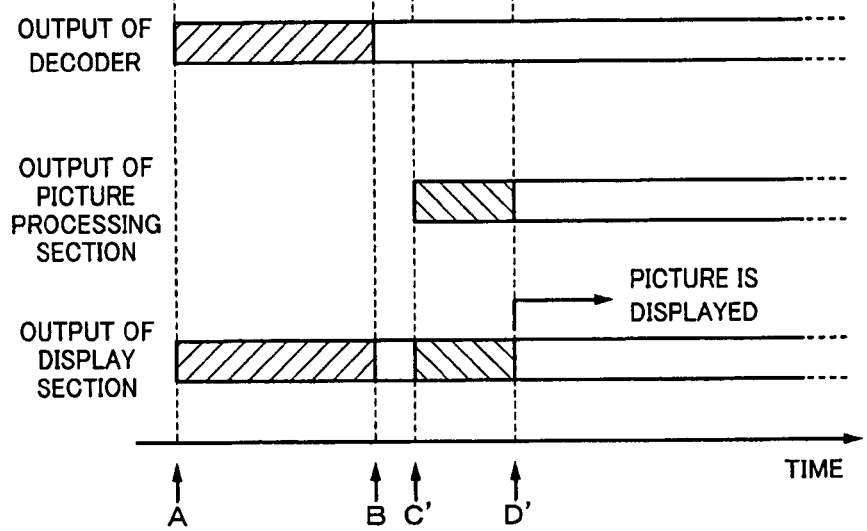

FIG. 7A shows an exemplary timing of the mute process after a program is selected until a picture is displayed when the receiving method according to this embodiment of the present invention is applied. For more in-depth understanding of this embodiment of the present invention, as a reference, FIG. 7B shows an exemplary timing of the mute process after a program is selected until a picture is displayed when the receiving method of the receiving apparatus of the related art is applied.

The operation in the case that the foregoing receiving method is applied will be described more specifically. As shown in FIG. 7A, when the user selects a program with the operating section 19 of the receiving apparatus 1 at time A, the receiving apparatus 1 normally performs the program selection process such that the digital tuner section 12 performs the tuning process and the demodulating process, the descrambler 13 performs the descrambling process, the DeMUX section 14 performs the demultiplexing process, and the decoder 15 performs the decoding process in a hatched region from time A to time B.

In the region from time A to time B, the video stream has not been completely decoded. Thus, since a decoded picture is not output, a disturbed picture is displayed on the display section. Thus, to prevent a disturbed picture from being displayed on the display section, in the region from time A to time B, the mute process is performed.

In parallel with the foregoing program selection process, information about a picture signal type including the resolution and aspect ratio of the target program is obtained from the program information database at time C. In a hatched region from time C to time D, the picture processing section 21 performs the picture process based on the information about the picture signal type.

In the region from time C to time D, a picture is disturbed. Thus, it is difficult to stably output a picture. As a result, a disturbed picture is displayed on the display section. To prevent a disturbed picture from being displayed on the display section, in the region from time C to time D, the mute process is performed. When the decoding process is completed and a picture is stably displayed at time D, the mute cancellation process is performed. The display section 25 stably displays a picture that has been selected.

It is thought that the picture process of the picture processing section 21 is completed in a shorter time period than the program selection process performed in parallel with the picture process. Thus, the picture process is completed while the program selection process is being performed. Thus, in the region from time A to time B, the mute process is substantially performed. A picture is displayed on the display section 25 at time B.

In contrast, in the receiving apparatus of the related art, as shown in FIG. 7B, since the program selection process and the picture process are not performed in parallel, in the region from time A to time B during the program selection process and in the region from time C' to time D' during the picture process, it is necessary to perform the mute process. Consequently, a picture is stably displayed at time D'.

Thus, with the receiving apparatus according to this embodiment of the present invention, the time period for the muting process in the region from time C' to time D' of the receiving apparatus of the related art can be decreased.

It should be understood by those skilled in the art that various modifications, combinations, sub-combinations and alternations may occur depending on design requirements and other factors insofar as they are within the scope of the appended claims or the equivalents thereof. In the foregoing embodiments of the present invention, the program information database used to perform the picture process is created on the basis of information about the picture signal type contained in the EIT. However, the present invention is not limited to such an example. Instead, for each service (programmed channel), the content obtained from the sequence header of the program that was selected last time may be stored to the storage section 20. When a program is selected next time, the content stored in the storage section 20 may be used. Thus, the foregoing embodiments of the present invention may be applied to a broadcast format in which the EIT is not transmitted.

In this case, these embodiments of the present invention can be applied not only to broadcasts, but for example picture data that are input from the outside of the receiving apparatus. Specifically, when an external input terminal such as a component input terminal or an HDMI (High Definition Multimedia Interface) input terminal is provided to the receiving apparatus 1 and picture data whose picture type including the resolution changes are input from such an external input terminal, these embodiments of the present invention can be applied.

In addition, both the program information database and the content of the sequence header of the program that has been selected last time may be used together. For example, the picture signal type described in the program information table and the picture signal type described in the sequence header may be stored in the storage section 20. When one of the picture signal type of the program information database and the picture signal type of the sequence header has not been stored, the picture process may be performed in parallel with the program selection process using the other picture signal type. When both the picture signal types are present, but they differ from each other, the picture process may not be performed in parallel with the program selection process.

These embodiments of the present invention may be applied not only to the foregoing ground digital television broadcast systems, but to satellite digital television broadcast systems such as BS (Broadcasting Satellite) digital television broadcasts and CS (Communication Satellite) digital television broadcasts.

What is claimed is:

1. A receiving apparatus, comprising:
a digital tuner section which selects a modulation signal having a predetermined frequency from a radio wave of a digital television broadcast, demodulates the modulation signal, and outputs a resultant transport stream;
a separation section which separates the transport stream into a video stream and an additional stream;
a decoder which decodes the video stream and outputs a picture signal;
a picture processing section which performs a predetermined picture process for the picture signal;
a control section which obtains program information containing information about a picture signal type of a program that is broadcast from the additional data and creates a program information database based on the program information, the program information database correlating program service identifications with program times, picture signal resolutions, and aspect ratios; and
a storage section which stores the program information database,
wherein the control section controls the predetermined picture process based on the picture signal type obtained with reference to the program information database in parallel with processes of the digital tuner section and the separation section,
wherein the picture processing section performs the predetermined picture process in parallel with processes of the digital tuner section and the separation section and starts the predetermined picture process for the picture signal at a time before the decoder completes decoding the video stream, and
wherein the picture processing section finishes the predetermined picture process before the decoder completes decoding the video stream, and a mute process is performed when the decoder decodes the video stream and the mute process is cancelled once the decoder completes decoding the video stream.

2. The receiving apparatus as set forth in claim 1,
wherein the control section searches the program information database for program information corresponding to a selected program based on a program selection operation.

3. The receiving apparatus as set forth in claim 1,
wherein the picture signal type of the video stream stored in a header of the video stream and the picture signal type of the program information corresponding to the video stream described in the program information database are compared, and
wherein when a compared result denotes that the picture signal types are different from each other, the picture process section performs the picture process based on the picture signal type stored in the header of the video stream.

4. The receiving apparatus as set forth in claim 1,
wherein the picture signal type includes a resolution and an aspect ratio of a corresponding picture signal.

5. A receiving method, comprising the steps of:
selecting a modulation signal having a predetermined frequency from a radio wave of a digital television broadcast, demodulating the modulation signal, and outputting a resultant transport stream;
separating the transport stream into a video stream and an additional stream;
decoding the video stream and outputting a picture signal;
performing a predetermined picture process for the picture signal;
obtaining program information containing information about a picture signal type of a program that is broadcast from the additional data and creating a program information database based on the program information, the program information database correlating program service identifications with program times, picture signal resolutions, and aspect ratios; and
storing the program information database,
wherein the control step is performed by controlling the predetermined picture process based on the picture signal type obtained with reference to the program information database in parallel with processes at the selecting step and the separating step,
wherein the performing step performs the predetermined picture process in parallel with processes of the selecting step and the separating step and starts the predetermined picture process for the picture signal at a time before the decoding step completes decoding the video stream, and
wherein the performing step finishes the predetermined picture process before the decoding step completes decoding the video stream, and a mute process is performed when the decoding step decodes the video stream and the mute process is cancelled once the decoding step completes decoding the video stream.

* * * * *